US012185103B2

(12) United States Patent
Raman et al.

(10) Patent No.: US 12,185,103 B2
(45) Date of Patent: Dec. 31, 2024

(54) METHODS AND SYSTEMS FOR SCALABLE HEAD END BASED AUTHENTICATION

(71) Applicant: Nile Global, Inc., Cupertino, CA (US)

(72) Inventors: Gopal Raman, San Jose, CA (US); Sathish Damodaran, San Jose, CA (US); Shibu Piriyath, Bangalore (IN); Rupesh Raghuvaran, Bangalore (IN); Venu Hemige, San Ramon, CA (US)

(73) Assignee: Nile Global, Inc., San Jose, CA (US)

( * ) Notice: Subject to any disclaimer, the term of this patent is extended or adjusted under 35 U.S.C. 154(b) by 378 days.

(21) Appl. No.: 17/359,448

(22) Filed: Jun. 25, 2021

(65) Prior Publication Data

US 2022/0369105 A1 Nov. 17, 2022

Related U.S. Application Data

(60) Provisional application No. 63/205,653, filed on May 12, 2021.

(51) Int. Cl.
*H04W 12/06* (2021.01)
*G06F 9/50* (2006.01)
*H04W 28/08* (2023.01)

(52) U.S. Cl.
CPC ............ *H04W 12/06* (2013.01); *G06F 9/505* (2013.01); *H04W 28/08* (2013.01)

(58) Field of Classification Search
CPC ........ H04W 12/06; H04W 28/08; G06F 9/505
See application file for complete search history.

(56) References Cited

U.S. PATENT DOCUMENTS

| 6,577,643 | B1* | 6/2003 | Rai | H04L 69/161 |
| | | | | 370/328 |
| 10,673,938 | B2* | 6/2020 | Peles | H04L 47/10 |
| 2010/0061232 | A1* | 3/2010 | Zhou | H04W 12/06 |
| | | | | 370/230 |
| 2012/0254221 | A1* | 10/2012 | Lai | G06F 16/2358 |
| | | | | 707/769 |
| 2016/0373273 | A1* | 12/2016 | Li | H04L 12/4633 |
| 2020/0280448 | A1 | 9/2020 | Ithal et al. | |
| 2020/0389869 | A1* | 12/2020 | Patil | H04W 12/069 |
| 2021/0120452 | A1* | 4/2021 | Kotecha | H04W 48/18 |

FOREIGN PATENT DOCUMENTS

JP 2010238101 A * 10/2010
WO WO-2016122545 A1 * 8/2016

* cited by examiner

*Primary Examiner* — Piotr Poltorak
*Assistant Examiner* — Lydia L Noel
(74) *Attorney, Agent, or Firm* — LOZA & LOZA LLP

(57) ABSTRACT

Embodiments of a device and method are disclosed. In an embodiment, a method of communications involves at a head end (HE), receiving an authentication message from a wireless access point (AP) deployed at a customer site, at the HE, performing a load balance operation in response to the authentication message to select a first authenticator from authenticators of the HE, at the HE, performing an authentication operation using the first authenticator based on the authentication message to generate an authentication request, and from the HE, transmitting the authentication request to an authentication server.

17 Claims, 7 Drawing Sheets

METHODS AND SYSTEMS FOR SCALABLE HEAD END BASED AUTHENTICATION

BACKGROUND

In a wireless network (e.g., a Wi-Fi network), a wireless client typically needs to be authenticated prior to being allowed to access network resources. For example, Institute of Electrical and Electronics Engineers (IEEE) 802.1x protocol typically requires a wireless client to authenticate with an authentication server (AS) (e.g., a Remote Authentication Dial-In User Service (RADIUS) server) by exchanging authentication messages with the AS. In many deployments, a central authenticator can be used to function as a front end to an AS. While having a central authenticator has operational benefits, a common problem that arises is that when the number of clients increase, the central authenticator can become a performance bottleneck. For example, even if the hardware platform of a central authenticator has multiple processors (e.g., central processing units (CPUs)) or threads, the hardware platform advantage cannot be taken advantage of because the software is typically written using an event-driven model, which is inherently single threaded. Therefore, there is a need for scalable authentication technology that can cope with fluctuation of the number of clients.

SUMMARY

Embodiments of a device and method are disclosed. In an embodiment, a method of communications involves at a head end (HE), receiving an authentication message from a wireless access point (AP) deployed at a customer site, at the HE, performing a load balance operation in response to the authentication message to select a first authenticator from authenticators of the HE, at the HE, performing an authentication operation using the first authenticator based on the authentication message to generate an authentication request, and from the HE, transmitting the authentication request to an authentication server. Other embodiments are described.

In some embodiments, the method further includes adjusting a number of authenticators executing in the HE in response to a change of authentication messages received at the HE.

In some embodiments, adjusting the number of authenticators executing in the HE in response to the change of authentication messages received at the HE includes increasing the number of authenticators executing in the HE in response to an increase of authentication messages received at the HE.

In some embodiments, the method further includes at the HE, receiving a second authentication message, at the HE, performing a second load balance operation in response to the second authentication message to select a second authenticator from the authenticators of the HE, at the HE, performing a second authentication operation using the second authenticator based on the second authentication message to generate a second authentication request, in parallel with performing the authentication operation using the first authenticator based on the authentication message to generate the authentication request, and from the HE, transmitting the second authentication request to the authentication server.

In some embodiments, at the HE, performing the authentication operation using the first authenticator based on the authentication message to generate the authentication request incudes at the HE, extracting a payload from the authentication message using the first authenticator and at the HE, encapsulating the payload into the authentication request using the first authenticator.

In some embodiments, the authentication server includes a RADIUS server, and the authentication request includes a RADIUS request.

In some embodiments, the method further includes at the HE, receiving an authentication response from the authentication server in response to the authentication request, at the HE, extracting a payload from the authentication response using the first authenticator, at the HE, encapsulating the payload into an authentication response message using the first authenticator, and from the HE, transmitting the authentication response message to the wireless AP.

In some embodiments, at the HE, performing the load balance operation in response to the authentication message to select the first authenticator from a plurality of authenticators of the HE includes at the HE, performing the load balance operation in response to the authentication message to select the first authenticator from a plurality of authenticators of the HE based on a load balance table.

In some embodiments, the HE or the authentication server is deployed remotely to the customer site.

In some embodiments, a communications device includes authenticators and a load balance unit connected to the authenticators. The load balance unit is configured to receive an authentication message from a wireless AP deployed at a customer site and to perform a load balance operation in response to the authentication message to select a first authenticator from the authenticators. The first authenticator is configured to perform an authentication operation based on the authentication message to generate an authentication request and to transmit the authentication request to an authentication server.

In some embodiments, the load balance unit is further configured to adjust a number of authenticators executing in the communications device in response to a change of authentication messages received at the communications device.

In some embodiments, the load balance unit is further configured to increase the number of authenticators executing in the communications device in response to an increase of authentication messages received at the communications device.

In some embodiments, the load balance unit is further configured to receive a second authentication message and to perform a second load balance operation in response to the second authentication message to select a second authenticator from the authenticators of the communications device, and the second authenticator is configured to perform a second authentication operation using the second authenticator based on the second authentication message to generate a second authentication request, in parallel with performing the authentication operation using the first authenticator based on the authentication message to generate the authentication request, and to transmit the second authentication request to the authentication server.

In some embodiments, the first authenticator is further configured to extract a payload from the authentication message and encapsulate the payload into the authentication request.

In some embodiments, the authentication server includes RADIUS server, and the authentication request includes a RADIUS request.

In some embodiments, the first authenticator is further configured to receive an authentication response from the authentication server in response to the authentication request, extract a payload from the authentication response using the first authenticator, and encapsulate the payload into an authentication response message, where the load balance unit is further configured to transmit the authentication response message to the wireless AP.

In some embodiments, the communications device or the authentication server is deployed remotely to the customer site.

In some embodiments, a method of communications involves at an HE deployed remotely to a customer site, receiving authentication messages from wireless APs deployed at the customer site, at the HE, performing a load balance operation in response to the authentication messages to select at least one authenticator from authenticators of the HE, using the at least one authenticator, extracting payloads from the authentication messages and encapsulating the payloads into authentication requests, from the HE, transmitting the authentication requests to an authentication server deployed remotely to the customer site, and at the HE, receiving authentication responses from the authentication server in response to the authentication requests.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
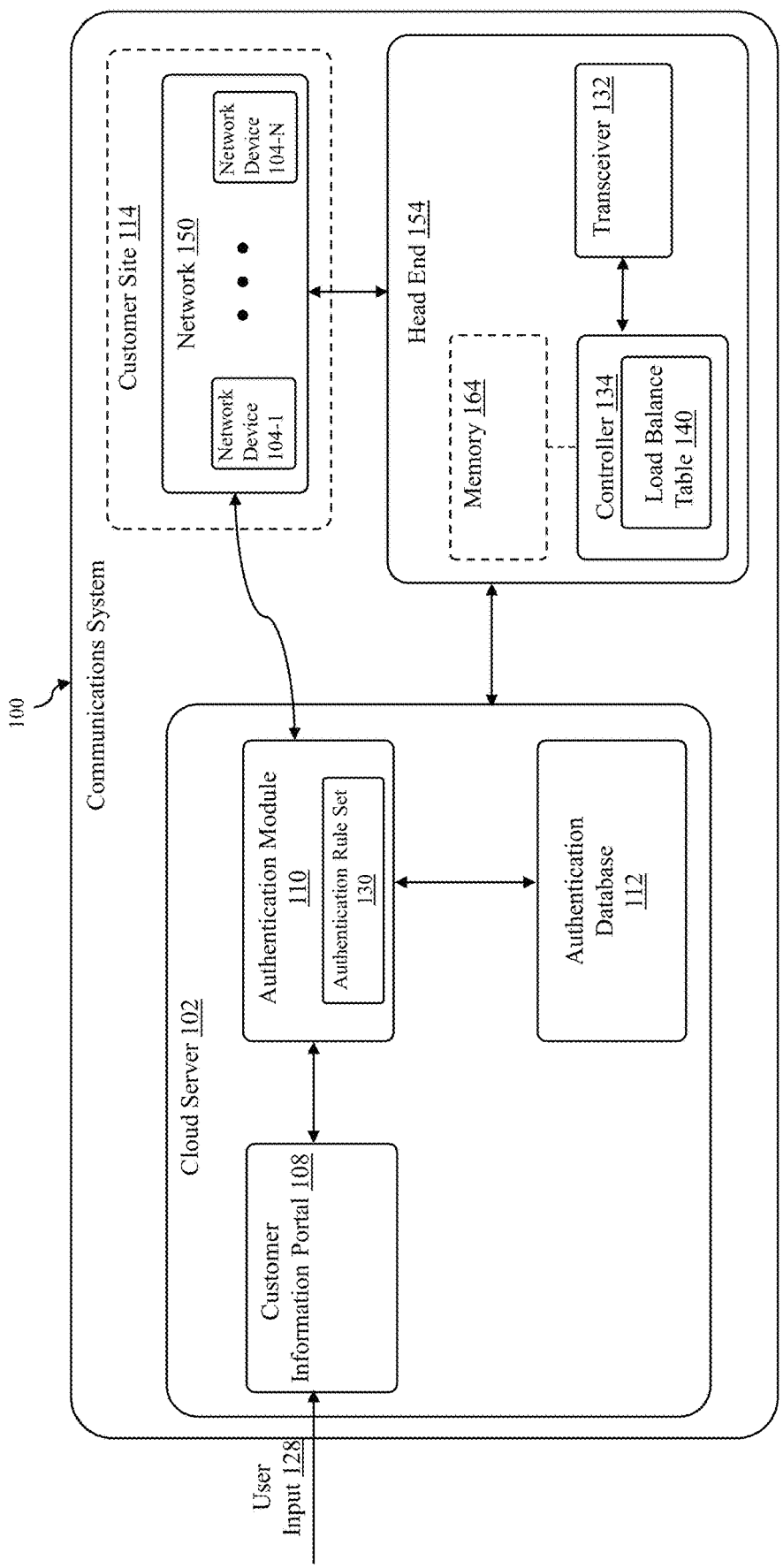
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a deployed network 150 within a customer site 114, and a head end (HE) 154. The cloud server, the network, and/or the HE may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, more than one HE, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a security service (e.g., an authentication service) to network devices (e.g., the deployed network 150) at the customer site. Because the cloud server can facilitate or perform a security service to network devices at the customer site, network security can be improved. In addition, because the cloud server can facilitate or perform a security service to network devices at the customer site, a user or customer of the customer site can be notified of security issues. In some embodiments, the cloud server is configured to generate a user interface to obtain user input information regarding network security in a floor plan of a customer site. In some embodiments, the user interface includes a graphical user interface. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPU), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an authentication module 110, a customer information portal 108 connected to the authentication module 110, and an authentication database 112 configured to store authentication data. The authentication module, the customer information portal, and/or the authentication database may be implemented in hardware (e.g., circuits), software, firmware, or a combination thereof. In some embodiments, the cloud server 102 is a Remote Authentication Dial-In User Service (RADIUS) server. Although the illustrated cloud server is shown with certain components and described with certain functionality herein, other embodiments of the cloud server may include fewer or more components to implement the same, less, or more functionality. For example, in some embodiments, the cloud server includes more than one authentication module, more than one customer information portal, and/or more than one authentication database. In another example, although the authentication module, the customer information portal, and the authentication database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the server. In some embodiments, the authentication module 110 is configured to facilitate or perform an authentication service to network devices (e.g., the deployed network 150) at the customer site 114, for example, using an authentication rule set 130. The authentication rule set 130 may include one or more authentication rules for network devices at the customer site 114, for example, for performing an authentication service to network devices at the customer site 114. In some embodiments, the authentication database 112 is configured to store authentication data for a network deployed and/or to be deployed at the customer site (e.g., a list of network devices deployed or to be deployed at the customer site). Because the authentication module can facilitate or perform an authentication service to network devices at the customer site, network security can be improved. In addition, because the authentication module can facilitate or perform an authentication service to network devices at the customer site, a user or customer (e.g., a layperson such as a worker on-site or an end-user such as an employee) at the customer site can be notified of authentication issues. The customer information portal 108 is configured to receive customer input 128. In some embodiments, the customer information portal is configured to include or generate a user interface that allows a customer to input information associated with an authentication service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one authentication server, at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a wireless sensor, a laptop, a desktop personal computer (PC), a mobile phone, or other wireless device that supports at least one WLAN communications protocol (e.g., an IEEE 802.11 protocol)).

Figure 4:
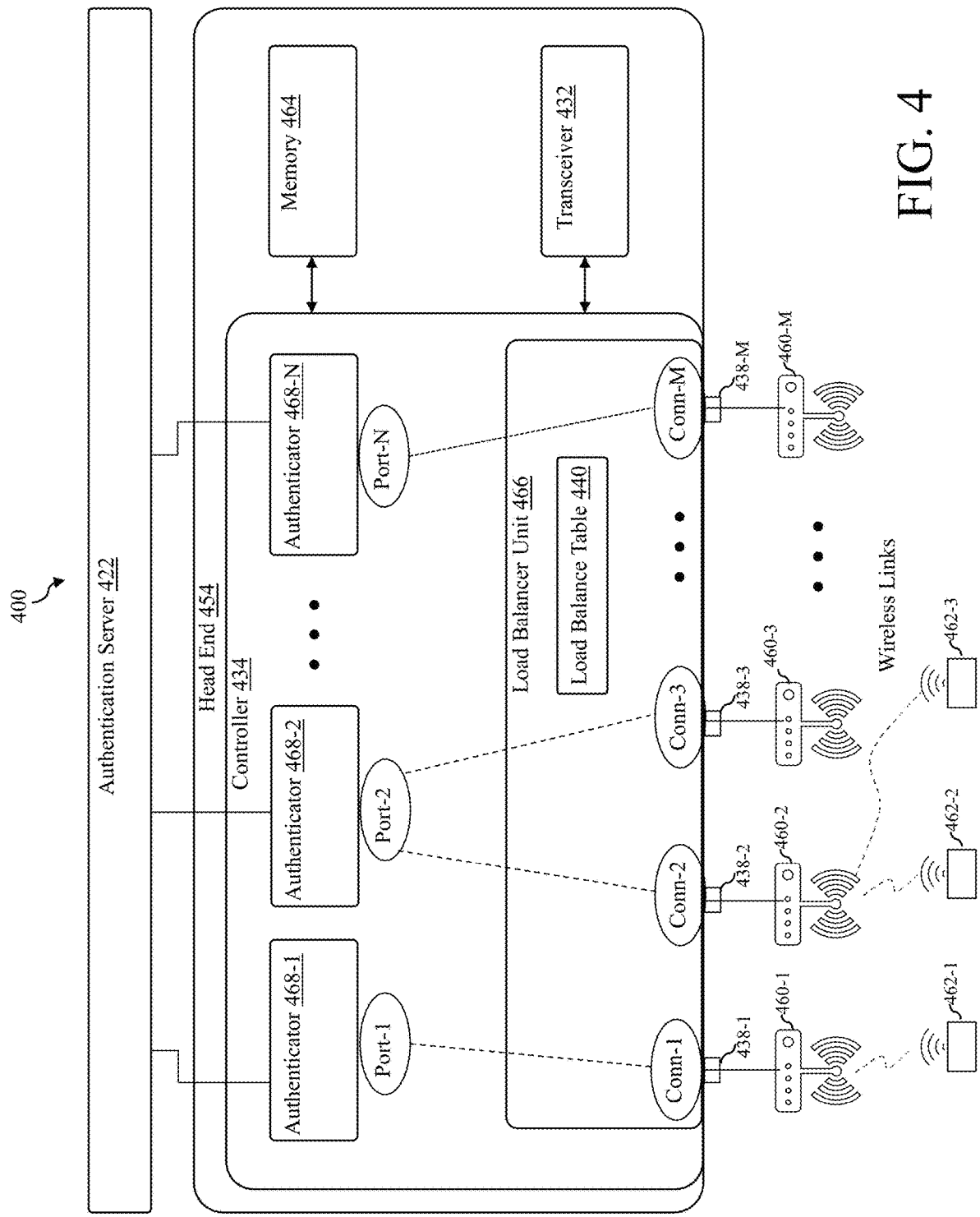
FIG. 4 depicts an embodiment of a communications system in accordance to an embodiment of the invention.

In the embodiment depicted in FIG. 1, the HE 154 functions as a front end to the cloud server 102 (e.g., an authentication server). In some embodiments, the cloud server 102 is a RADIUS server. In these embodiments, the HE serves as a RADIUS front end and relays messages between a RADIUS server (e.g., the cloud server 102) and a corresponding network device 104-1, . . . , or 104-N. In some embodiments, the HE 154 signs authentication messages (e.g., RADIUS messages) using a shared secret, which can be shared, for example, between the HE and the cloud server 102 (e.g., a RADIUS server). Because the HE can serve as an authentication (e.g., RADIUS) front end and sign authentication messages (e.g., RADIUS messages) using a shared secret, authentication credentials do not have to be distributed to the network devices 104-1, . . . , 104-N that are located in hard to secure locations. In the embodiment depicted in FIG. 4, the HE 154 includes a transceiver 132 (e.g., a wireless and/or wired transceiver), a controller 134 operably connected to the transceiver and including or storing a load balance table 140, and memory 164. In some embodiments, the transceiver includes a physical layer (PHY) device. The transceiver may be any suitable type of transceiver. In some embodiments, the controller is configured to control the transceiver to process packets received through one or more network ports and/or to generate outgoing packets to be transmitted through the network ports. In some embodiments, the controller 434 is configured to perform an authentication function for the wireless clients 462-1, 462-2, 462-3. In some embodiments, the controller (e.g., a microcontroller, a DSP, and/or a CPU) is configured to execute instructions such as, for example, executable instructions that may be used to perform one or more operations described herein and may be stored in the memory. In some embodiments, the memory is volatile memory used for retrieving programs and processing data. The memory may include, for example, one or more random access memory (RAM) modules. Although the illustrated HE is shown with certain components and described with certain functionality herein, other embodiments of the HE may include fewer or more components to implement the same, less, or more functionality. For example, in some embodiments, the memory is embedded into another component (e.g., the controller 434) of the HE. In another example, although the components of the HE are shown in FIG. 4 as being connected in certain topology, the topology of the HE is not limited to the topology shown in FIG. 4. In another example, the HE includes one or more network ports, which may be located outside, on, and/or inside the packaging of the HE. The network ports may be any suitable type of logical or physical port. For example, the network ports may be LAN network ports such as Ethernet ports or Transmission Control Protocol (TCP) connections. However, the network ports that can be implemented in the HE are not limited to LAN network ports.

Figure 2:
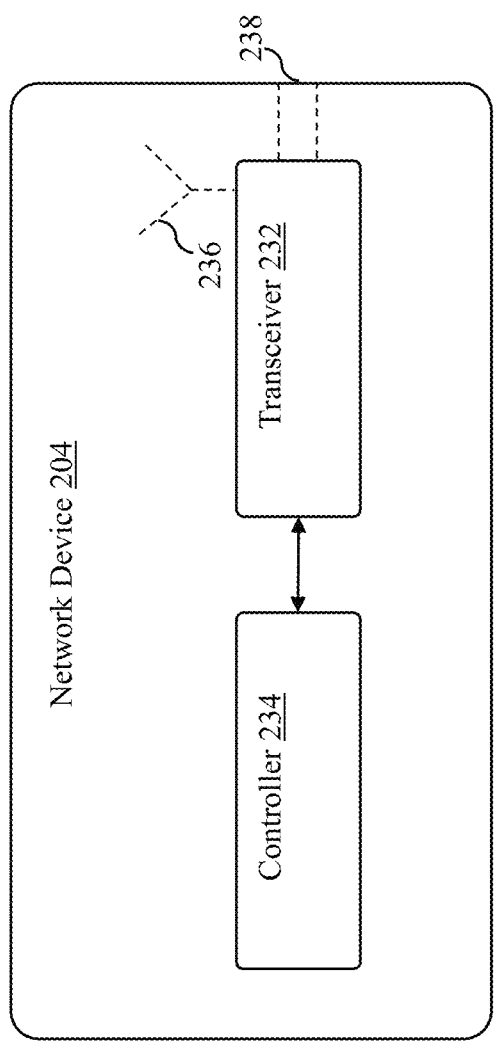
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be an authentication server, an HE or gateway, a wireless access point, or a sensor, described in details with reference to FIG. 2. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a PH) device. The transceiver 232 may be any suitable type of transceiver. For example, the transceiver 232 may be a short-range communications transceiver (e.g., a Bluetooth) or a WLAN transceiver (e.g., a transceiver compatible with an IEEE 802.11 protocol). In some embodiments, the network device 204 includes multiple transceivers, for example, a short-range communications transceiver (e.g., a Bluetooth) and a WLAN transceiver (e.g., a transceiver compatible with an IEEE 802.11 protocol). In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to perform an authentication function for the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
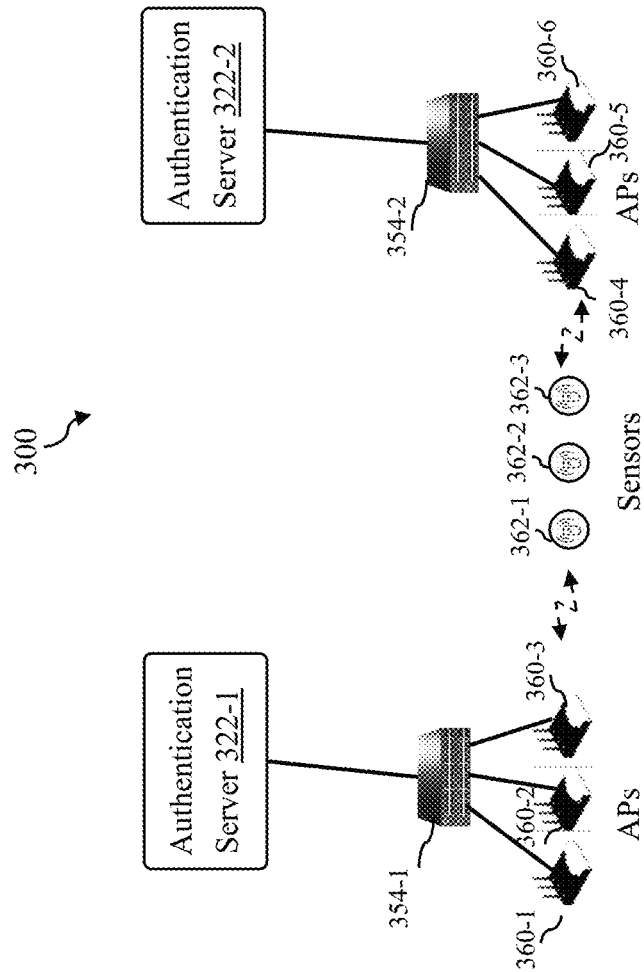
FIG. 3 depicts an embodiment of a communications system in accordance to an embodiment of the invention.

FIG. 3 depicts an embodiment of a communications system 300 in accordance to an embodiment of the invention. The communications system depicted in FIG. 3 is one possible embodiment of the communications system 100 depicted in FIG. 1. However, the communications system depicted in FIG. 1 are not limited to the embodiment shown in FIG. 3. In the embodiment depicted in FIG. 3, the communications system 300 includes a pair of authentication servers 322-1, 322-2, a number of head ends (HEs) or gateways 354-1, 354-2 that can interact with lower-level devices (e.g., wireless APs), a number of wireless APs 360-1, 360-2, 360-3, 360-4, 360-5, 360-6 connected to the HEs 354-1, 354-2, and a number of wireless clients, which are implemented as wireless sensors 362-1, 362-2, 362-3 that wirelessly connect to the wireless APs. However, the wireless clients are not limited to wireless sensors and can include a laptop, a desktop personal computer (PC), a mobile phone, or other wireless device that supports at least one WLAN communications protocol (e.g., an IEEE 802.11 protocol)). In the embodiment depicted in FIG. 3, the authentication servers 322-1, 322-2 and the HEs 354-1, 354-2 are located remotely from the customer site 114, for example, in a data center. In some embodiments, at least one local authentication server (i.e., an authentication server deployed in the customer site 114) and/or at least one local HE (i.e., an HE deployed in the customer site 114) is used, instead of or in addition of the remote authentication servers 322-1, 322-2 and the remote HEs 354-1, 354-2. In some embodiments, at least one of the authentication servers 322-1, 322-2, the HEs 354-1, 354-2, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2. In some embodiments, at least one of the authentication servers 322-1, 322-2 is implemented the same as or similar to the cloud server 102 depicted in FIG. 1. For example, at least one of the authentication servers 322-1, 322-2 includes an authentication module and an authentication database configured to store authentication data, which may be implemented in hardware (e.g., circuits), software, firmware, or a combination thereof. In some embodiments, the authentication servers 322-1, 322-2 are configured to facilitate or perform an authentication service to the wireless sensors 362-1, 362-2, 362-3, for example, using an authentication rule set, which may include one or more authentication rules. Although the illustrated communications system 300 is shown in FIG. 3 with certain components and described with certain functionality herein, other embodiments of the communications system may include fewer or more components to implement the same, less, or more functionality. For example, the communications system may include different number of authentication servers, HEs, wireless APs, and/or wireless sensors.

In the embodiment depicted in FIG. 3, the HE 354-1 or 354-2 is used as a central entity that functions as a front end to the authentication server 322-1 or 322-2. In some embodiments, at least one of the authentication servers 322-1, 322-2 is a RADIUS server. In these embodiments, the HE 354-1 or 354-2 serves as a RADIUS front end and relays messages between a RADIUS server and a corresponding wireless AP. In some embodiments, the HE 354-1 or 354-2 signs authentication messages (e.g., RADIUS messages) using a shared secret, which can be shared, for example, between the HE 354-1 or 354-2 and the authentication server 322-1 or 322-2 (e.g., a RADIUS server). Because the HE 354-1 or 354-2 can serve as an authentication (e.g., RADIUS) front end and sign authentication messages (e.g., RADIUS messages) using a shared secret, authentication credentials do not have to be distributed to APs that are located in hard to secure locations. In some embodiments, cryptographic security is implemented between the wireless AP 360-1, 360-2, 360-3, 360-4, 360-5, 360-6 and the HE 354-1 or 354-2 to protect 802.1X messages in the end-to-end path. In the embodiment depicted in FIG. 3, the HE 354-1 or 354-2 can dynamically adjust the number of authenticator processes based on client load. For example, the HE 354-1 or 354-2 can execute or run multiple copies of an authenticator process (also referred to as a worker process) to increase the number of clients that can be processed simultaneously. The HE 354-1 or 354-2 can also manage the traffic flow such that the load is evenly balanced among the worker processes. For example, if multiple authentication servers or processes are available, the HE 354-1 or 354-2 can balance client load among the authentication servers or processes. In some embodiments, a table-driven load balancing scheme is used to spreads clients among worker processes.

In some embodiments, at least one wireless client (e.g., the wireless sensor 362-1, 362-2, or 362-3) is installed in the customer site 114, for example, to monitor the network 150 and perform both active and passive testing of the network 150. For example, at least one wireless sensor checks the health and performance of the wireless network and reports collected data for analysis. In some embodiments, a wireless client (e.g., the wireless sensor 362-1, 362-2, or 362-3) includes a wireless transceiver, a controller operably connected to the wireless transceiver, and at least one antenna operably connected to the wireless transceiver. The wireless transceiver may be any suitable type of transceiver. For example, the wireless transceiver may be a short-range communications transceiver (e.g., a Bluetooth) or a WLAN transceiver (e.g., a transceiver compatible with an IEEE 802.11 protocol). In some embodiments a wireless client (e.g., the wireless sensor 362-1, 362-2, or 362-3) includes multiple wireless transceivers, for example, a short-range communications transceiver (e.g., a Bluetooth) and a WLAN transceiver (e.g., a transceiver compatible with an IEEE 802.11 protocol). In some embodiments, the controller is configured to control the wireless transceiver to process packets received through the antenna and/or to generate outgoing packets to be transmitted through the antenna. In some embodiments, the controller is configured to perform an authentication function. The antenna may be any suitable type of antenna. For example, the antenna may be an induction type antenna such as a loop antenna or any other suitable type of induction type antenna. However, the antenna is not limited to an induction type antenna.

FIG. 4 depicts an embodiment of a communications system 400 in accordance to an embodiment of the invention. The communications system 400 depicted in FIG. 4 is one possible embodiment of the communications system 100 depicted in FIG. 1. However, the communications system 100 depicted in FIG. 1 are not limited to the embodiment shown in FIG. 4. In the embodiment depicted in FIG. 4, the communications system 400 includes an authentication server 422, a head end (HE) or gateway 454, a number of wireless APs 460-1, . . . , 460-M (M being a positive integer) connected to the HE 454, and a number of wireless clients 462-1, 462-2, 462-3 that wirelessly connect to the wireless APs. In the embodiment depicted in FIG. 4, the HE 454 functions as a front end to the authentication server 422. In some embodiments, the authentication server 422 is a RADIUS server. In these embodiments, the HE serves as a RADIUS front end and relays messages between a RADIUS server (the authentication server 422) and a corresponding wireless AP. In some embodiments, the HE 454 signs authentication messages (e.g., RADIUS messages) using a shared secret, which can be shared, for example, between the HE 454 and the authentication server 422 (e.g., a RADIUS server). Consequently, authentication credentials do not have to be distributed to APs that are located in hard to secure locations. The HE 454 may be an embodiment of the HEs 354-1, 354-2 depicted in FIG. 3. However, the HEs 354-1, 354-2 depicted in FIG. 3 are not limited to the embodiment depicted in FIG. 4. The wireless clients may include a wireless sensor, a laptop, a desktop PC, a mobile phone, or other wireless device that supports at least one WLAN communications protocol (e.g., an IEEE 802.11 protocol)). In some embodiments, the authentication server 422 is a RADIUS server. In some embodiments, at least one of the authentication server 422, the HE 454, the wireless APs 460-1, . . . , 460-M, and the wireless clients 462-1, 462-2, 462-3 depicted in FIG. 4 is implemented as the network device 204 depicted in FIG. 2. In some embodiments, the authentication server 422 is configured to facilitate or perform an authentication service to the wireless clients 462-1, 462-2, 462-3, for example, using an authentication rule set, which may include one or more authentication rules. In the embodiment depicted in FIG. 4, the authentication server 422 and the HE 454 are located remotely from the customer site 114, for example, in a data center. However, in some embodiments, at least one local authentication server (i.e., an authentication server deployed in the customer site 114) and/or at least one local HE (i.e., an HE deployed in the customer site 114) is used, instead of or in addition of the authentication server 422 and the HE 354. Although the illustrated communications system 400 is shown in FIG. 4 with certain components and described with certain functionality herein, other embodiments of the communications system may include fewer or more components to implement the same, less, or more functionality. For example, the communications system may include different number of authentication servers, HEs, wireless APs, and/or wireless clients.

In the embodiment depicted in FIG. 4, the wireless clients 462-1, 462-2, 462-3, which may be wireless sensors or other client devices, are the entities that need to be authenticated before being allowed access to network resources. Each wireless client connects wirelessly to one or more wireless APs. In the embodiment depicted in FIG. 4, the wireless client 462-1 is wireless connected to the wireless AP 460-1 while the wireless clients 462-2, 462-3 are wireless connected to the wireless AP 460-2. The wireless clients 462-1, 462-2, 462-3 and the wireless APs 460-1, . . . , 460-M are distributed throughout a customer site (e.g., the customer site 114), which can include at least one building or campus. The wireless APs 460-1, . . . , 460-M are connected over a wired network to the HE 454, which may be located in a data center where other server resources are located. The wireless APs 460-1, . . . , 460-M send authentication related request messages from the wireless clients 462-1, 462-2, 462-3 to the HE 454 through connections Conn-1, . . . , Conn-M. In some embodiments, at least one of the connections Conn-1, . . . , Conn-M is a secure transport connection based on TCP or other protocol. In the embodiment depicted in FIG. 4, the HE 454 is configured to dynamically adjust the number of authenticator processes based on client load. In some embodiments, the HE 454 is a compute resource or platform that runs an authenticator function. In an embodiment, the role of the authenticator is to mediate access to one or more authentication servers (e.g., the authentication server 422), which may be RADIUS servers. For example, the HE 454 can execute or run multiple copies of an authenticator process (also referred to as a worker process) to increase the number of clients that can be processed simultaneously. Because multiple instances of the authenticator process can be executed on the hardware platform of the HE 454, the hardware platform advantage (e.g., multiple processors (e.g., (CPUs)) or threads) of the HE 454 can be utilized. In some embodiments, each instance or worker process runs on a different CPU/thread and can process client requests in parallel to each other. The HE 454 is also configured to manage the traffic flow such that the load is evenly balanced among the worker processes. For example, if multiple authentication servers or processes are available, the HE 454 can balance client load among the authentication servers or processes. In some embodiments, a table-driven load balancing scheme is used to spreads clients among worker processes.

In the embodiment depicted in FIG. 4, the HE 454 includes a transceiver 432 (e.g., a wireless and/or wired transceiver), a controller 434 operably connected to the transceiver 432, and an optional memory 464, which may be a standalone unit or embedded into another component (e.g., the controller 434) of the HE. In some embodiments, the transceiver 432 includes a PHY device. The transceiver 432 may be any suitable type of transceiver. In some embodiments, the controller 434 is configured to control the transceiver 432 to process received packets and/or to generate outgoing packets to be transmitted. In some embodiments, the controller 434 is configured to perform an authentication function for the wireless clients 462-1, 462-2, 462-3. Although the illustrated HE 454 is shown with certain components and described with certain functionality herein, other embodiments of the HE may include fewer or more components to implement the same, less, or more functionality. For example, in some embodiments, the HE includes a number of network ports 438-1, . . . , 438-M, which may be logical ports or physical ports. The network ports 438-1, . . . , 438-M may be located outside, on, and/or inside the packaging of the HE. The network ports may be any suitable type of logical and/or physical ports. For example, the network ports may be LAN network ports such as Ethernet ports. In some embodiments, the network ports 438-1, . . . , 438-M are TCP connections where each TCP connection corresponds to a wireless AP. However, the network ports are not limited to LAN network ports. In another example, although the components of the HE are shown in FIG. 4 as being connected in certain topology, the topology of the HE is not limited to the topology shown in FIG. 4. In some embodiments, the connections Conn-1, Conn-2, Conn-3, . . . , Conn-M are TCP connections that originate from the corresponding AP and all the connections Conn-1, Conn-2, Conn-3, . . . , Conn-M are connected to a single network port 438-1, . . . , or 438-M (e.g., a LAN/Ethernet port).

In the embodiment depicted in FIG. 4, the HE 454 (e.g., the controller 434) includes a number of authenticators 468-1, . . . , 468-N (N being a positive integer) and a load balancer (LB) unit 466 connected to the authenticators. In some embodiments, the maximum value for N is the number of hardware threads available on the platform of the HE 454. In some embodiments, the load balancer unit, which may be or include a software process, acts as a connection server to the wireless APs 460-1, . . . , 460-M, which are connected to the HE 454 through connections Conn-1, . . . , Conn-M. Authentication related messages from the wireless clients 462-1, 462-2, 462-3 are connected through the connections Conn-1 and Conn-2 of the wireless APs 460-1 and 460-2 to which the wireless clients 462-1, 462-2, 462-3 are associated. In some embodiments, the load balancer unit is configured to forward an authentication request received through a connection Conn-1, . . . , or Conn-M to one of the authenticators 468-1, . . . , 468-N. Each of the dashed lines represents an internal communication session between the load balancer unit and a corresponding worker process executing in the authenticator 468-1, . . . , or 468-N. In some embodiments, a worker process executing in the authenticator 468-1, . . . , or 468-N receives an authentication request from the load balancer unit and encapsulates the authentication request into a RADIUS request and sends the RADIUS request to a RADIUS server (e.g., the authentication server 422). In the reverse direction, the RADIUS server (e.g., the authentication server 422) sends a RADIUS response message in response to the RADIUS request. In some embodiments, a worker process executing in the authenticator 468-1, . . . , or 468-N extracts an authentication response from the RADIUS response and forwards the authentication response over the internal session to the load balancer unit. Each internal session may correspond to exactly one of the connections Conn-1, Conn-M M. The load balancer unit then sends the authentication response on the connection to a corresponding wireless AP 460-1, . . . , or 460-M, which forwards the authentication response over the wireless medium to a corresponding wireless client 462-1, 462-2, or 462-3. In some embodiments, the authenticators 468-1, . . . , 468-N are instances of an authentication processor. Each of the authenticators 468-1, . . . , 468-N may have an internal communication link to the load balancer unit and a network connection to the authentication server 422 (e.g., a RADIUS server), for example, through a User Datagram Protocol (UDP) socket. In some embodiments, each of the authenticators 468-1, . . . , 468-N is configured to receive an authentication request received from the load balancer unit, to encapsulate the authentication request into a RADIUS request, and to send the RADIUS to a RADIUS server (e.g., the authentication server 422). In the reverse direction, each of the authenticators 468-1, . . . , 468-N receives a response from the RADIUS server (e.g., the authentication server 422), extracts an authentication message from the response and then forwards the authentication message over an internal communication link to the load balancer unit. The load balancer unit may determine how many worker instances should be running at any given time. In some embodiments, the number of worker instances should be running at any given time is determined based on how much authentication message load the load balancer unit is subjected to. In some embodiments, a new worker processor is spawned or initiated for every K (K being a positive integer) AP connections active at the load balancer unit. Based on platform measurements under typical loading conditions, the value of K can be determined. Generally speaking, the higher the load coming in through a wireless AP, the smaller the value of K is. In some embodiments, other schemes that take into account the number of clients associated to each wireless AP can also be used.

In some embodiments, the load balancer unit 466 is configured to receive an authentication message from a wireless AP 460-1, . . . , or 460-M deployed at a customer site and to perform a load balance operation in response to the authentication message to select a first authenticator from the authenticators 468-1, . . . , 468-N. In some embodiments, the first authenticator is configured to perform an authentication operation based on the authentication message to generate an authentication request and to transmit the authentication request to an authentication server. In some embodiments, the load balance unit is further configured to adjust a number of authenticators executing in the HE in response to a change of authentication messages received at the HE. In some embodiments, the load balance unit is further configured to increase the number of authenticators executing in the HE in response to an increase of authentication messages received at the HE. In some embodiments, the load balance unit is further configured to receive a second authentication message and to perform a second load balance operation in response to the second authentication message to select a second authenticator from the authenticators of the HE, and the second authenticator is configured to perform a second authentication operation using the second authenticator based on the second authentication message to generate a second authentication request, in parallel with performing the authentication operation using the first authenticator based on the authentication message to generate the authentication request, and to transmit the second authentication request to the authentication server. In some embodiments, the first authenticator is further configured to extract a payload from the authentication message and encapsulate the payload into the authentication request. In some embodiments, the authentication server includes a RADIUS server, and the authentication request includes a RADIUS request. In some embodiments, the first authenticator is further configured to receive an authentication response from the authentication server in response to the authentication request, extract a payload from the authentication response using the first authenticator, and encapsulate the payload into an authentication response message, and the load balance unit is further configured to transmit the authentication response message to the wireless AP. In some embodiments, the authentication server includes a RADIUS server, and the authentication response includes a RADIUS response. In some embodiments, the load balance unit is further configured to perform the load balance operation in response to the authentication message to select the first authenticator from a plurality of authenticators of the HE based on a load balance table. In some embodiments, the HE and/or the authentication server are deployed remotely to the customer site.

Figure 5:
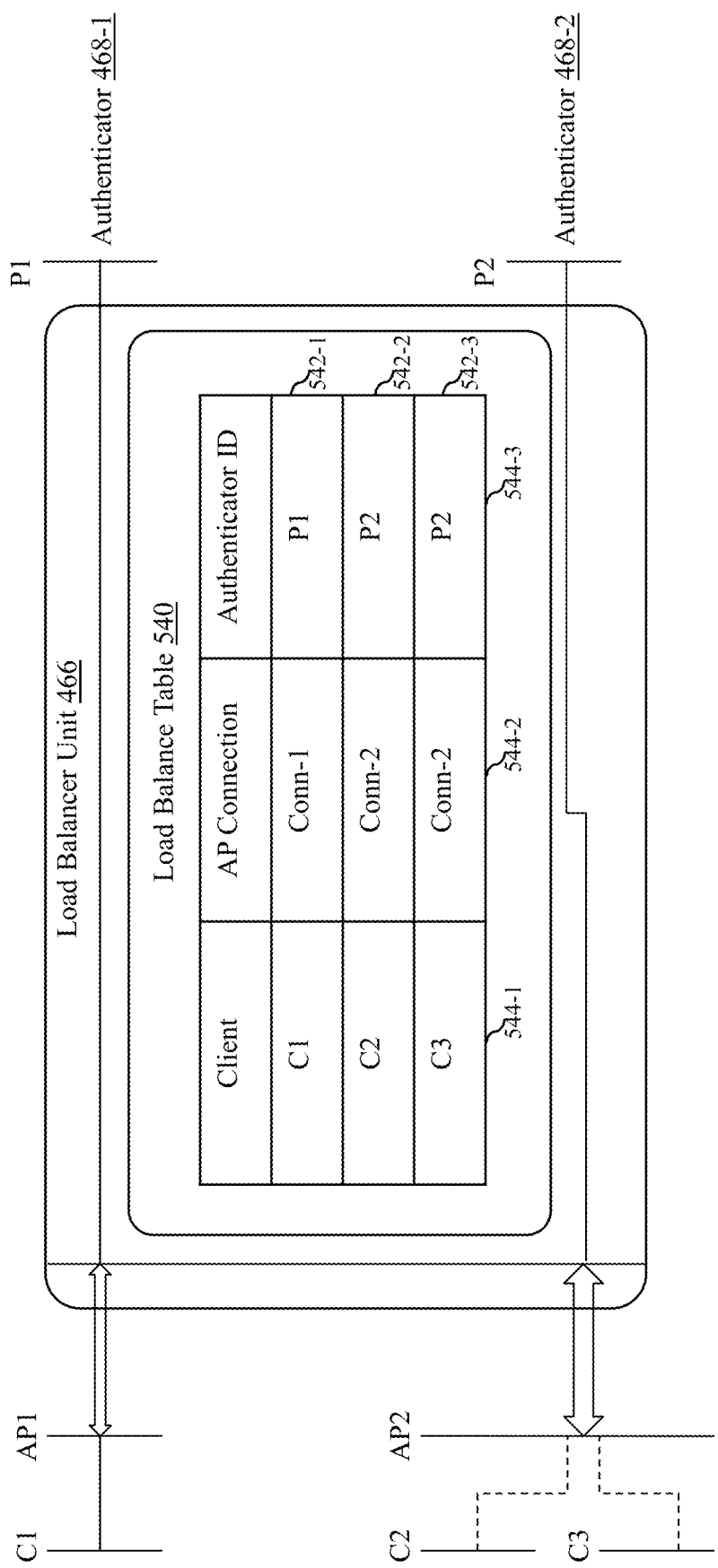
FIG. 5 depicts a load balance table that can be used in a load balancer unit of the communications system depicted in FIG. 4.

The load balancer unit 466 may use different policies to determine the number of worker/authenticator processes to run for a given network configuration and traffic load. In some embodiments, a table-driven mechanism is used to implement different policies. FIG. 5 depicts a load balance table 540 that can be used in the load balancer unit 466 depicted in FIG. 4. The load balance table 540 depicted in FIG. 5 is one possible embodiment of the load balance table 440 depicted in FIG. 4. However, the load balance table 440 depicted in FIG. 4 is not limited to the embodiment shown in FIG. 5. In the embodiment depicted in FIG. 5, the load balance table 440 contains three rows 542-1, 542-2, 542-3 of client, AP connection and authenticator ID data that are listed in three columns 544-1, 544-2, 544-3. The first column 544-1 contains the wireless client identifier (e.g., a MAC address), the second column 544-2 contains the AP connection through which the wireless client is connected to the HE, and the third column 544-3 contains the authenticator instance or worker to which a connection is mapped. Each incoming client can be mapped to a unique authenticator instance to achieve fine grain load balancing. The first row 542-1 in the load balance table 540 shows that client C1 (i.e., the wireless client 462-1) is connected to the HE 454 through connection Conn-1 (i.e., through the wireless AP 460-1), which is connected to the authenticator 468-1 through the port P1, the second row 542-2 in the load balance table 540 shows that client C2 (i.e., the wireless client 462-2) is connected to the HE 454 through connection Conn-2 (i.e., through the wireless AP 460-2), which is connected to the authenticator 468-2 through the port P2, and the third row 542-3 in the load balance table 540 shows that client C3 (i.e., the wireless client 462-3) is connected to the HE 454 through connection Conn-2 (i.e., through the wireless AP 460-2), which is connected to the authenticator 468-2 through the port P2.

In an installation with several hundred or even thousands of clients, a single authentication server (e.g., a single RADIUS server) may not be able to handle the authentication load. In some embodiments, multiple instances of a RADIUS server (e.g., the authentication server 422) are deployed. Each authenticator instance may be directed to one of the RADIUS server instances such that the load across the RADIUS servers is balanced. Consequently, the communications system 400 can be scaled as the client population increases. In some embodiments, the table driver approach can be adapted by adding an extra column to the load balance table 540 that indicates which RADIUS instance an authenticator 468-1, . . . , or 468-N communicates with.

Figure 6:
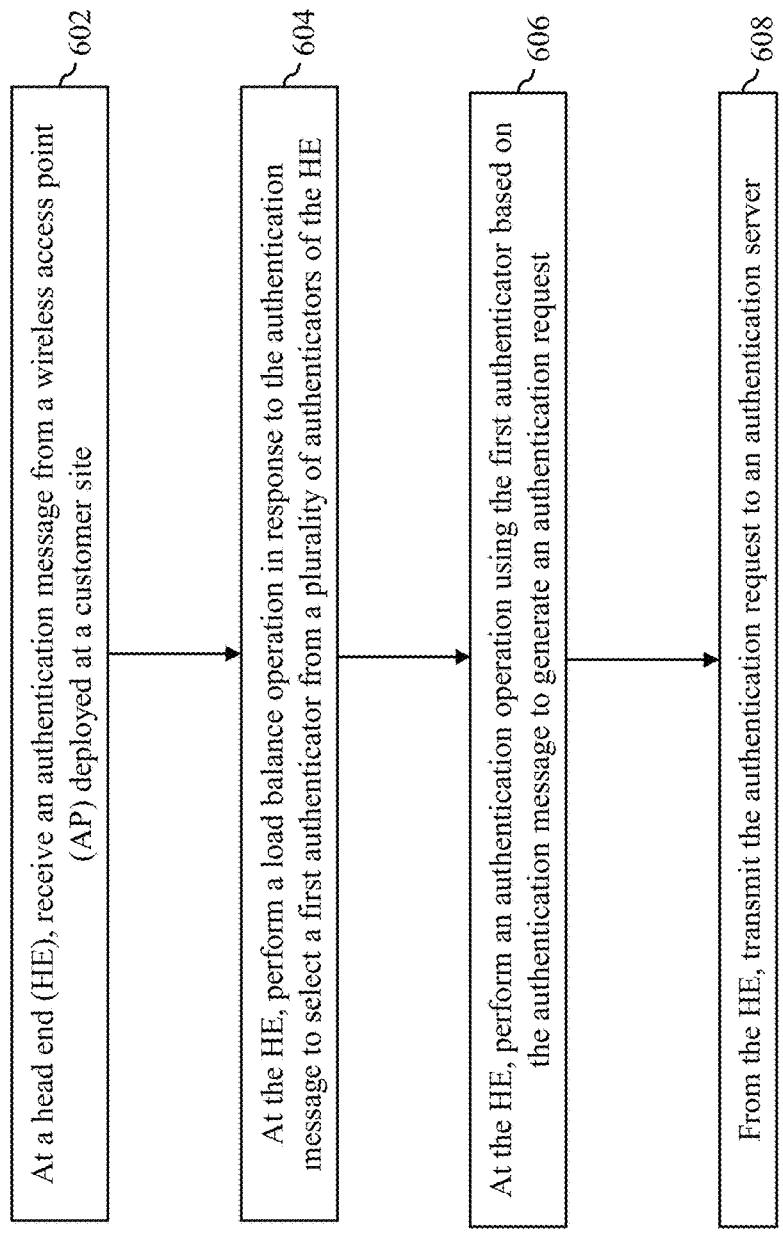
FIG. 6 is a process flow diagram of a method of communications in accordance to an embodiment of the invention.

FIG. 6 is a process flow diagram of a method of communications in accordance to an embodiment of the invention. According to the method, at block 602, at an HE, an authentication message is received from a wireless AP deployed at a customer site. At block 604, at the HE, a load balance operation is performed in response to the authentication message to select a first authenticator from a plurality of authenticators of the HE. At block 606, at the HE, an authentication operation is performed using the first authenticator based on the authentication message to generate an authentication request. At block 608, from the HE, the authentication request is transmitted to an authentication server. In some embodiments, the number of authenticators executing in the HE is adjusted in response to a change of authentication messages received at the HE. In some embodiments, the number of authenticators executing in the HE is increased in response to an increase of authentication messages received at the HE. In some embodiments, at the HE, a second authentication message is received, at the HE, a second load balance operation is performed in response to the second authentication message to select a second authenticator from the authenticators of the HE, at the HE, a second authentication operation is performed using the second authenticator based on the second authentication message to generate a second authentication request, in parallel with performing the authentication operation using the first authenticator based on the authentication message to generate the authentication request, and from the HE, the second authentication request is transmitted to the authentication server. In some embodiments, at the HE, a payload is extracted from the authentication message using the first authenticator, and at the HE, the payload is encapsulated into the authentication request using the first authenticator. In some embodiments, the authentication server includes a RADIUS server, and the authentication request includes a RADIUS request. In some embodiments, at the HE, an authentication response is received from the authentication server in response to the authentication request, at the HE, a payload is extracted from the authentication response using the first authenticator, at the HE, the payload is encapsulated into an authentication response message using the first authenticator, and from the HE, the authentication response message is transmitted to the wireless AP. In some embodiments, the authentication server includes a RADIUS server, and the authentication response includes a RADIUS response. In some embodiments, at the HE, the load balance operation is performed in response to the authentication message to select the first authenticator from a plurality of authenticators of the HE based on a load balance table. In some embodiments, the HE and/or the authentication server are deployed remotely to the customer site. The HE may be similar to, the same as, or a component of the HE 354-1, 354-2 depicted in FIG. 3 and/or the HE 454 depicted in FIG. 4. The customer site may be similar to, the same as, or a component of the customer site 114 depicted in FIG. 1. The wireless AP may be similar to, the same as, or a component of the wireless APs 360-1, 360-2, 360-3, 360-4, 360-5, 360-6 depicted in FIG. 3 and/or the wireless APs 460-1, . . . , 460-M depicted in FIG. 4. The authentication server may be similar to, the same as, or a component of the authentication servers 322-1, 322-2 depicted in FIG. 3 and/or the authentication server 422 depicted in FIG. 4. The authenticators may be similar to, the same as, or a component of the authenticators 468-1, . . . , 468-N depicted in FIG. 4.

Figure 7:
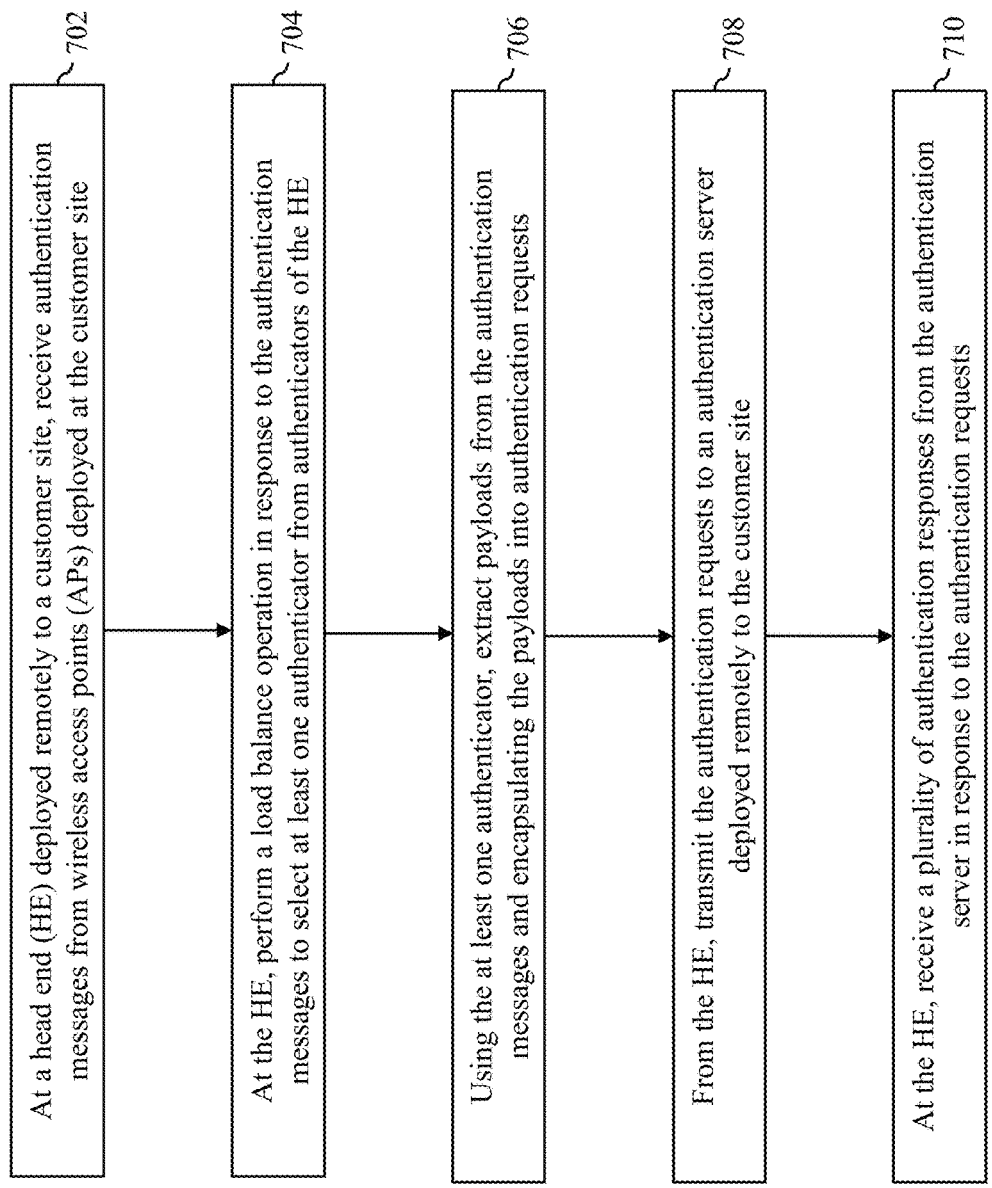
FIG. 7 is a process flow diagram of a method of communications in accordance to an embodiment of the invention.

FIG. 7 is a process flow diagram of a method of communications in accordance to an embodiment of the invention. According to the method, at block 702, at an HE deployed remotely to a customer site, authentication messages are received from wireless APs deployed at the customer site. At block 704, at the HE, a load balance operation is performed in response to the authentication messages to select at least one authenticator from authenticators of the HE. At block 706, using the at least one authenticator, payloads are extracted from the authentication messages and encapsulating the payloads into authentication requests. At block 708, from the HE, the authentication requests are transmitted to an authentication server deployed remotely to the customer site. At block 710, at the HE, authentication responses are received from the authentication server in response to the authentication requests. The HE may be similar to, the same as, or a component of the HE 354-1, 354-2 depicted in FIG. 3 and/or the HE 454 depicted in FIG. 4. The customer site may be similar to, the same as, or a component of the customer site 114 depicted in FIG. 1. The wireless APs may be similar to, the same as, or a component of the wireless APs 360-1, 360-2, 360-3, 360-4, 360-5, 360-6 depicted in FIG. 3 and/or the wireless APs 460-1, . . . , 460-M depicted in FIG. 4. The authentication server may be similar to, the same as, or a component of the authentication servers 322-1, 322-2 depicted in FIG. 3 and/or the authentication server 422 depicted in FIG. 4. The authenticators may be similar to, the same as, or a component of the authenticators 468-1, . . . , 468-N depicted in FIG. 4.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
at a head end (HE), receiving an authentication message from a wireless access point (AP) deployed at a customer site;
at the HE, performing a load balance operation in response to the authentication message to select a first authenticator from a plurality of authenticators of the HE, wherein each of the plurality of authenticators of the HE runs on a different processor or thread and processes a plurality of client requests in parallel to each other;
at the HE, performing an authentication operation using the first authenticator based on the authentication message to generate an authentication request by extracting a payload from the authentication message and encapsulating the payload into the authentication request; and
from the HE, transmitting the authentication request to an authentication server,
wherein at the HE, performing the load balance operation comprises at the HE, performing the load balance operation in response to the authentication message to select the first authenticator from the authenticators of the HE based on a load balance table that includes a plurality of wireless client identification (ID) numbers associated with a plurality of wireless clients, a list of AP connections through which the wireless clients are connected to the HE, and a list of corresponding authenticator IDs that represent a plurality of authenticator port numbers to which the AP connections are mapped.

2. The method of claim 1, further comprising adjusting a number of authenticators executing in the HE in response to a change of authentication messages received at the HE.

3. The method of claim 2, wherein adjusting the number of authenticators executing in the HE in response to the change of authentication messages received at the HE comprises increasing the number of authenticators executing in the HE in response to an increase of authentication messages received at the HE.

4. The method of claim 1, further comprising:
at the HE, receiving a second authentication message;
at the HE, performing a second load balance operation in response to the second authentication message to select a second authenticator from the authenticators of the HE;
at the HE, performing a second authentication operation using the second authenticator based on the second authentication message to generate a second authentication request, in parallel with performing the authentication operation using the first authenticator based on the authentication message to generate the authentication request; and
from the HE, transmitting the second authentication request to the authentication server.

5. The method of claim 1, wherein the authentication server comprises a Remote Authentication Dial-In User Service (RADIUS) server, and wherein the authentication request comprises a RADIUS request.

6. The method of claim 1, further comprising:
at the HE, receiving an authentication response from the authentication server in response to the authentication request;
at the HE, extracting a payload from the authentication response using the first authenticator;
at the HE, encapsulating the payload into an authentication response message using the first authenticator; and
from the HE, transmitting the authentication response message to the wireless AP.

7. The method of claim 6, wherein the authentication server comprises a Remote Authentication Dial-In User Service (RADIUS) server, and wherein the authentication response comprises a RADIUS response.

8. The method of claim 1, wherein the HE or the authentication server is deployed remotely to the customer site.

9. A communications device, the communications device comprising:
a plurality of authenticators, wherein each of the plurality of authenticators of the HE runs on a different processor or thread and processes a plurality of client requests in parallel to each other; and
a load balance unit connected to the authenticators, wherein the load balance unit is configured to receive an authentication message from a wireless access point (AP) deployed at a customer site and to perform a load balance operation in response to the authentication message to select a first authenticator from the authenticators, and wherein the plurality of authenticators and the load balance unit are implemented using a hardware processor; and
wherein the first authenticator is configured to perform an authentication operation based on the authentication message to generate an authentication request by extracting a payload from the authentication message and encapsulating the payload into the authentication request and to transmit the authentication request to an authentication server,
wherein the load balance unit is further configured to perform the load balance operation in response to the authentication message to select the first authenticator from the authenticators of the HE based on a load balance table that includes a plurality of wireless client identification (ID) numbers associated with a plurality of wireless clients, a list of AP connections through which the wireless clients are connected to the HE, and a list of corresponding authenticator IDs that represent a plurality of authenticator port numbers to which the AP connections are mapped.

10. The communications device of claim 9, wherein the load balance unit is further configured to adjust a number of authenticators executing in the communications device in response to a change of authentication messages received at the communications device.

11. The communications device of claim 10, wherein the load balance unit is further configured to increase the number of authenticators executing in the communications device in response to an increase of authentication messages received at the communications device.

12. The communications device of claim 9, wherein the load balance unit is further configured to receive a second authentication message and to perform a second load balance operation in response to the second authentication message to select a second authenticator from the authenticators of the communications device, and wherein the second authenticator is configured to perform a second authentication operation using the second authenticator based on the second authentication message to generate a second authentication request, in parallel with performing the authentication operation using the first authenticator based on the authentication message to generate the authentication request, and to transmit the second authentication request to the authentication server.

13. The communications device of claim 9, wherein the authentication server comprises a Remote Authentication Dial-In User Service (RADIUS) server, and wherein the authentication request comprises a RADIUS request.

14. The communications device of claim 9, wherein the first authenticator is further configured to:
receive an authentication response from the authentication server in response to the authentication request;
extract a payload from the authentication response using the first authenticator; and
encapsulate the payload into an authentication response message,
wherein the load balance unit is further configured to transmit the authentication response message to the wireless AP.

15. The communications device of claim 14, wherein the authentication server comprises a Remote Authentication Dial-In User Service (RADIUS) server, and wherein the authentication response comprises a RADIUS response.

16. The communications device of claim 9, wherein the communications device or the authentication server is deployed remotely to the customer site.

17. A method of communications, the method comprising:
- at a head end (HE) deployed remotely to a customer site, receiving a plurality of authentication messages from a plurality of wireless access points (APs) deployed at the customer site;
- at the HE, performing a load balance operation in response to the authentication messages to select at least one authenticator from a plurality of authenticators of the HE, wherein each of the plurality of authenticators of the HE runs on a different processor or thread and processes a plurality of client requests in parallel to each other;
- using the at least one authenticator, extracting a plurality of payloads from the authentication messages and encapsulating the payloads into a plurality of authentication requests;
- from the HE, transmitting the authentication requests to an authentication server deployed remotely to the customer site; and
- at the HE, receiving a plurality of authentication responses from the authentication server in response to the authentication requests, wherein at the HE, performing the load balance operation comprises at the HE, performing the load balance operation in response to the authentication message to select the first authenticator from the authenticators of the HE based on a load balance table that includes a plurality of wireless client identification (ID) numbers associated with a plurality of wireless clients, a list of AP connections through which the wireless clients are connected to the HE, and a list of corresponding authenticator IDs that represent a plurality of authenticator port numbers to which the AP connections are mapped.

* * * * *